(12) United States Patent
Tesch et al.

(10) Patent No.: US 11,814,587 B2
(45) Date of Patent: Nov. 14, 2023

(54) METHOD FOR TREATING PETROLEUM OR NATURAL GAS

(71) Applicant: Rainer Tesch, Al Fateh (BH)

(72) Inventors: Rainer Tesch, Al Fateh (BH); Hassan Anany, Al Fateh (BH)

(73) Assignee: Rainer Tesch, Manama (BH)

(*) Notice: Subject to any disclaimer, the term of this patent is extended or adjusted under 35 U.S.C. 154(b) by 355 days.

(21) Appl. No.: 16/472,663

(22) PCT Filed: Dec. 22, 2017

(86) PCT No.: PCT/EP2017/084468
§ 371 (c)(1),
(2) Date: Jun. 21, 2019

(87) PCT Pub. No.: WO2018/115482
PCT Pub. Date: Jun. 28, 2018

(65) Prior Publication Data
US 2019/0367818 A1    Dec. 5, 2019

(30) Foreign Application Priority Data
Dec. 22, 2016   (EP) .................... 16206423

(51) Int. Cl.
*C10G 29/00* (2006.01)
*C10L 3/10* (2006.01)
(Continued)

(52) U.S. Cl.
CPC ............ *C10G 29/00* (2013.01); *C10G 32/00* (2013.01); *C10L 1/1826* (2013.01);
(Continued)

(58) Field of Classification Search
CPC ..... C10G 29/00; C10G 2300/80; C10L 3/103; C10L 2200/0469; C10L 2250/02; C10L 2200/0484
See application file for complete search history.

(56) References Cited

U.S. PATENT DOCUMENTS 2,975,103 A    3/1961  Isidor
4,359,324 A *  11/1982 Elsea, Jr. ................ C10L 1/026
                                                             44/308
(Continued)

FOREIGN PATENT DOCUMENTS

AU         684253 B2 * 12/1997 ............ C12N 15/52
CN       101490220 A     7/2009
(Continued)

OTHER PUBLICATIONS

Machine Translation of CN-104629874-A (Year: 2015).*
(Continued)

*Primary Examiner* — Ellen M McAvoy
*Assistant Examiner* — Ming Cheung Po
(74) *Attorney, Agent, or Firm* — ArentFox Schiff LLP

(57) ABSTRACT

A method for treating petroleum, petroleum fraction, or natural gas, the process comprising:
adding
  a) a first component which is selected from material, particularly roots, of a plant of the genus *Glycyrrhiza*, and/or an arbuscular mycorrhizal fungi, and
  b) a second component which is selected from a plant material or -ingredient comprising plastids, algae and/or cyanobacteria,
to the petroleum, petroleum fraction, or natural gas.

13 Claims, 4 Drawing Sheets

(51) Int. Cl.
*C10G 32/00* (2006.01)
*C10L 1/182* (2006.01)
*C10L 1/222* (2006.01)
*C10L 10/02* (2006.01)

(52) U.S. Cl.
CPC ............ *C10L 1/2222* (2013.01); *C10L 3/103* (2013.01); *C10L 10/02* (2013.01); *C10G 2300/202* (2013.01); *C10G 2300/80* (2013.01); *C10L 2200/0469* (2013.01); *C10L 2200/0484* (2013.01); *C10L 2250/02* (2013.01); *C10L 2290/26* (2013.01); *C10L 2290/36* (2013.01)

(56) References Cited

U.S. PATENT DOCUMENTS

| | | | |
|---|---|---|---|
| 4,632,906 A | 12/1986 | Kopacz | |
| 5,002,888 A | 3/1991 | Kilbane, II | |
| 5,496,729 A | 3/1996 | Monticello | |
| 5,529,930 A | 6/1996 | Monticello et al. | |
| 5,858,766 A * | 1/1999 | Premuzic | C12N 1/205 435/262.5 |
| 6,071,738 A * | 6/2000 | Johnson | C10G 32/00 435/130 |
| 6,156,946 A | 12/2000 | Coyle et al. | |
| 6,306,288 B1 | 10/2001 | Pittman et al. | |
| 6,337,204 B1 | 1/2002 | Monot et al. | |
| 6,461,859 B1 * | 10/2002 | Duhalt | C10G 27/12 435/282 |
| 7,101,410 B1 * | 9/2006 | Baugh | C10G 32/00 435/281 |
| 2003/0093943 A1 * | 5/2003 | Jordan | C10L 1/326 44/307 |
| 2009/0217571 A1 * | 9/2009 | Singh | C10G 53/14 44/385 |
| 2010/0247593 A1 * | 9/2010 | Wikberg | A61K 36/58 424/773 |
| 2012/0042565 A1 * | 2/2012 | Theaker | C10L 10/02 44/308 |
| 2012/0144887 A1 * | 6/2012 | Fiato | C10J 3/72 71/7 |

FOREIGN PATENT DOCUMENTS

| | | | |
|---|---|---|---|
| CN | 101602957 A | 12/2009 | |
| CN | 104542835 A | 4/2015 | |
| CN | 104629874 A * | 5/2015 | |
| CN | 105524675 A * | 4/2016 | |
| DE | 3842716 A1 | 6/1990 | |
| DE | 102009012507 A | 9/2010 | |
| EP | 0409314 A1 | 1/1991 | |
| EP | 2966255 A2 | 1/2016 | |
| GB | 2303127 A | 2/1997 | |
| WO | WO-8404653 A1 * | 12/1984 | ............ A01G 18/10 |
| WO | 2007093171 A1 | 8/2007 | |
| WO | WO-2010103394 A2 * | 9/2010 | ............ C10G 32/00 |
| WO | 2013036316 A1 | 3/2013 | |

OTHER PUBLICATIONS

Machine Translation of CN-105524675-A (Year: 2016).*
Machine Translation of WO-2010103394-A2 (Year: 2010).*
Biello, "Pay Dirt: How to Turn Tar Sand into Oil [Slide Show]," scientificamerican.com/article/how-to-turn-tar-sands-into-oil-slideshow/, Dec. 10, 2012.
"Artificial Symbiosis—Opposition to GMOs Spurs New Bio-Engineering Techniques," American Scientist, Jan.-Feb. 2017.
"Biosynthesis of Hydrocarbons by Environmental Microbes," Environmental Microbiology, 19, (2017).
Klotz et al., "Awakening of a Dormant Cyanobacterium from Nitrogen Chlorosis Reveals a Genetically Determined Program," Current Biology, 26, Nov. 7, 2016, pp. 2862-2872.
Yadav et al., "Arbuscular Mycorrhizal Fungi Induced Acclimatization and Growth Enhancement of Glycyrrhiza glabra L.: A Potential Medicinal Plant," Agric Res, 2, Mar. 2013, pp. 43-47.
"Depletion: A Determination for the World's Petroleum Reserve," The Hill's Group: Report# HC3-433; Version 2, Mar. 1, 2015.
Frey-Klett et al., "Bacterial-Fungal Interactions: Hyphens between Agricultural, Clinical, Environmental and Food Microbiologists," Microbiology and Molecular Biology Reviews, vol. 75, No. 4, Dec. 2011, pp. 583-609.
Awadh et al., "Statistical Analysis of the Relations between API, Specific Gravity and Sulfur Content in the Universal Crude Oil," International Journal of Science and Research (IJSR), vol. 4, Issue 5, May 2015.
"NS-1435 Water-Soluble Corrosion Inhibitor, NS-1442 Corrosion Inhibitor, NS-1471 Corrosion Inhibitor, NS-2129 Corrosion/Scale/Paraffin, NS-1445 Drilling Corrosion Inhibitor, NovaCide 1125" NovaStar: Technical Information, NovaStar LP, 2013.
Friedrich et al., "Oxidation of Reduced Inorganic Sulfur Compounds by Bacteria: Emergence of a Common Mechanism?," American Society for Microbiology, aem.asm.org/content/67/7/2873.full, Jul. 2001.
Swift, "Licorice Oil for Eczema", Commonwealth Center for Holistic Herbalism, Feb. 7, 2012, retrieved from https://commonwealthherbs.com/licorice-oil-for-eczema/, 2 pages.
International Search Report issued in PCT/EP2017/084468, dated Feb. 19, 2018, 5 pages.

* cited by examiner

METHOD FOR TREATING PETROLEUM OR NATURAL GAS

CROSS REFERENCE TO RELATED APPLICATIONS

This application is a 35 U.S.C. 371 National Phase of PCT Application No. PCT/EP2017/084468 filed Dec. 22, 2017, which claims priority to EP Patent Application No. 16206423.2 filed Dec. 22, 2016, the disclosure of these prior applications are hereby incorporated by reference in their entireties.

FIELD OF THE INVENTION

The present invention relates to a method for treating petroleum or natural gas, a petroleum or a natural gas obtainable by such method, a method for preparing an addition agent for petroleum or natural gas and an addition agent for petroleum or natural gas obtainable by such method.

BACKGROUND OF THE INVENTION

Sulfur and sulfur-containing compounds in crude oil result in degradation of oil quality (API gravity, viscosity, salts, bottom sediments, and water).

Such sulfur-containing compounds, particularly sulfides, and especially soluble sulfides ($H_2S$, $HS^-$, $S^{2-}$, or combinations thereof), frequently detected in petroleum and oil field brines as a consequence of the activities of sulfate-reducing bacteria (SRB) pose serious problems due to their toxicity, odor, corrosive nature, and potential for well bore plugging. Current treatment technologies for sulfide removal include physical/chemical methods such as stripping with steam or flue gas, air oxidation, and precipitation. However, microbial treatment may be a more efficient and cost-effective alternative for reducing sulfide levels.

In order to remove sulfur-containing products from crude oil, naphtha and derivatives, attempts have been made long since to find microbiological procedures. E.g., as can be seen in a comprehensive paper published in 1978 by Malik (ref. (1) at the end of the present specification), *Desulfovibrio desulfuricans*, *Arthrobacter* sp., *Pseudomonas* sp., *Pseudomonas aeruginosa*, *Acinetobacter* sp., *Rhizobium* sp. were researched.

EP 0 409 314 A1 discloses a stable, single-phased solution of water-in-oil microemulsions that contain microorganisms and/or parts thereof are described. They are obtained by adding to crude oil and/or at least one product of the refining of same an aqueous concentrated solution of microorganisms and/or parts thereof, in such a way that said aqueous solution is solubilized in crude oil or the refined product and that the blend thus obtained has the form of a stable, single-phased solution.

GB 2 303 127 A discloses a process for oxidation of sulfide compounds in brines, oil and/or gases by contact with a bacterial culture preferably containing a *Campylobacter* species. The brine, oil or gas may also contain a nitrate.

OBJECTIVE OF THE INVENTION

It is an objective of the present invention to provide a method for treating petroleum, petroleum fractions or natural gas in order to reduce sulfur, particularly sulfides.

SUMMARY OF THE INVENTION

This objective is solved by a method according to claim 1 for treating petroleum, a petroleum fraction or natural gas.

In further aspects, laid down in further independent claims, the invention also provides with a petroleum or a natural gas, obtainable by such method, a method for preparing an addition agent for petroleum, petroleum fractions or natural gas, wherein the addition agent can be used for (treating) petroleum, a petroleum fraction, or natural gas, particularly for reducing sulfur or sulfur compounds, and an addition agent for petroleum or natural gas which is obtainable by such method.

The present invention provides with a method (also called process) for treating, particularly for reducing sulfur and sulfur compounds in petroleum, a petroleum fraction, or natural gas, the process comprising: Adding a) a first component which is selected from material, particularly roots, of a plant of the genus *Glycyrrhiza*, and/or an arbuscular mycorrhizal fungi, and b) a second component which is selected from a plant material or -ingredient comprising plastids, algae and/or cyanobacteria to the petroleum, petroleum fraction, or natural gas.

This invention may be called a chemo-biological process, or a fermentation process, for treating petroleum (also called crude oil), petroleum fractions and natural gas.

In petroleum and petroleum fractions the invention, in general or specific embodiments, leads to one or more of the following results for the petroleum and/or petroleum fractions:

reduces sulfate-reducing bacteria (SRB)
reduces sulfur and sulfur compounds
lowers particularly the $H_2S$ concentration, preferably to harmless levels (<10 ppm), or even substantially eliminates $H_2S$
reduces salts
reduces heavy metals content
increases API gravity, either in well reservoirs or in processing facilities (upstream or downstream)
decreases viscosity
increases energy density of petroleum or petroleum fractions
generates raffinates with high API gravity, that are, inter alia, environment-friendly
leads to decrease of corrosion in processing facilities and application apparatus, e.g. gas turbines
decreases corrosion, e.g. in pipelines and tanks, particularly microbially influenced corrosion (MIC)
prevents or reduces biofouling In natural gas, the invention, in general or specific embodiments, leads to one or more of the following results:
reduces sulfur (sweetens sour gas). Sulfur or sulfur compounds particularly precipitate from the gas
increases the heat rate
decreases the specific gravity
increases volume
lowers the $H_2S$ concentration, preferably to harmless levels (<10 ppm)
decreases corrosion in pipelines or storage tanks The invention, in general or specific embodiments, provides with one or more of the following benefits:
is suitable for oil well intervention and increases production volume
increases refinery process gain of the petroleum and/or the petroleum fractions and increases the whole efficiency, particularly the production rate and light/medium fraction yields, of the refinery plant
reduces transportation energy needs and reduces crude oil shipping costs reduces equipment mechanical failure due to cold and hot corrosion facilitates the concept of 'anti-degradation' and 'anti-depletion' of crude oil global reserves direct production of petroleum raffinates with high API gravity can be used as a clean fuel for combustion engines as a more viable energy source that decreases fuel consumption and reduces emissions reduces the environmental impact in terms of emissions and greenhouse gases of petroleum or natural gas production, processing and product consumption through its efficiency increases and purity in a paradigm shifting way Exemplary and non-limiting petroleum fractions the method can be applied to are liquefied petroleum gas (LPG), liquefied natural gas (LNG), gasoline (petrol), naphtha, kerosene, diesel fuel, fuel oils, lubricating oils, paraffin wax, asphalt, heavy fuel oils, tar, bitumen.

The process can be applied upstream in subterranean reservoirs and at surficial recovery plants as well as at downstream in refining and processing facilities.

The process can be applied to the treatment of petroleum or a petroleum fraction, particularly bitumen, that is comprised by/in oil sand. The process of the invention can be used to treat oil sand. Oil sands, also known as tar sands or crude bitumen, or more technically bituminous sands, are a type of petroleum deposit. Oil sands may be either loose sands or partially consolidated sandstone containing a naturally occurring mixture of sand, clay, and water, saturated with a dense and viscous form of petroleum technically referred to as bitumen.

The process can be applied to the treatment of heavy fuel oil or sludge that results from heavy fuel oil. Particularly heavy fuel oil or sludge that is comprised in fuel tanks, for example of ships, in (industrial) furnaces or in (industrial) combustion plants. If applied in this manner, the process can help to liquefy heavy fuel oil residues, particularly sludge. The process can, as alternative, be used to refine heavy fuel oil.

The present invention also provides with a petroleum, a petroleum fraction, or a natural gas, obtainable by or obtained by above-said method or, as a further or additional definition, comprising, as additives above-mentioned first and second components.

The invention also provides with a method for preparing an addition agent for petroleum, a petroleum fraction, or natural gas, the method comprising:

Mixing a first component which is selected from material, particularly roots, of a plant of the genus *Glycyrrhiza*, and/or an arbuscular mycorrhizal fungi, and a second component which is selected from a plant material or -ingredient comprising plastids, algae and/or cyanobacteria The present invention also provides with an addition agent for petroleum, a petroleum fraction, or natural gas, obtainable by or obtained by above-said method or, as a further or additional definition, comprising said first and second components.

The addition agent may be used in above-mentioned method for treating petroleum, a petroleum fraction, or natural gas.

In a more general aspect, the present invention also provides with a method for treating petroleum, a petroleum fraction, or natural gas, the process comprising: adding a component which is selected from material, particularly roots, of a plant of the genus *Glycyrrhiza*, and/or an arbuscular mycorrhizal fungi, to the petroleum, petroleum fraction, or natural gas. Here, only the above-mentioned first component is added.

In a further general aspect, the present invention also provides with a method for treating petroleum, a petroleum fraction, or natural gas, the process comprising:

adding a component which is selected from a plant material or -ingredient comprising plastids, algae and/or cyanobacteria, to the petroleum, petroleum fraction, or natural gas. Here, only the above-mentioned second component is added.

In a further general aspect, the present invention provides with a method for treating petroleum, a petroleum fraction, or natural gas, the process comprising:

Adding a) a first component which is selected from material, particularly roots, of a plant of the genus *Glycyrrhiza*, and/or an arbuscular mycorrhizal fungi, and b) a specific second component which is a plant material or -ingredient which is selected from olive oil, preferably unrefined olive oil, and/or leave extract from leaves of a plant of the genus *Olea*, particularly *Olea europaea* to the petroleum, petroleum fraction, or natural gas.

According to this aspect, it is not strictly necessary, but possible, that the specific second component comprises plastids. The present invention also provides with a petroleum, a petroleum fraction, or a natural gas, obtainable by or obtained by afore-said method or, as a further or additional definition, comprising, as additives afore-said first component and specific second component.

The invention also provides with a method for preparing an addition agent for petroleum, a petroleum fraction, or natural gas, the method comprising:

Mixing a first component which is selected from material, particularly roots, of a plant of the genus *Glycyrrhiza*, and/or an arbuscular mycorrhizal fungi, and a specific second component which is a plant material or -ingredient which is selected from olive oil, preferably unrefined olive oil, and/or leave extract from leaves of a plant of the genus *Olea*, particularly *Olea europaea*.

According to this aspect, it is not strictly necessary, but possible, that the specific second component comprises plastids. The present invention also provides with an addition agent for petroleum, a petroleum fraction, or natural gas, obtainable by or obtained by above-said method or, as a further or additional definition, comprising afore-said first component and specific second component.

DETAILED DESCRIPTION OF THE INVENTION

Any numbering of components, such as "first component" and "second component" is intended to distinguish components from each other and name components by kind of abbreviation. Such numbering is not intended to mean a sequence of adding, or using.

When in this invention a liquid hydrocarbon is used or employed, the liquid hydrocarbon can be selected from one or more of an aliphatic hyrocarbon and an aromatic hydrocarbon.

The aliphatic hydrocarbon may be an alcohol. An alcohol is in one more specific embodiment an aliphatic alcohol, preferably a C1-C10 alcohol, such as methanol, ethanol, propanol, butanol or pentanol, wherein all isomers thereof are encompassed.

An aromatic hydrocarbon in the present invention may comprise benzene, Toluene, Xylene, and any mixture of one or more thereof.

The liquid hydrocarbon is preferably not a triglyceride or not a vegetable oil.

The term liquid particularly refers to liquid state at usual temperature for performing the methods of the invention, particularly room temperature, even more particularly at 20° C. or at least 20° C.

First Component:

The first component is selected from
material, particularly roots, of a plant of the genus *Glycyrrhiza*, and/or
an arbuscular mycorrhizal fungi (AMF).

The material, particularly roots, of a plant of the genus *Glycyrrhiza*, is in a specific embodiment material, particularly roots, from *Glycyrrhiza glabra*. *Glycyrrhiza* is known to live in symbiosis with arbuscular mycorrhizal fungi (also abbreviated as AMF, also called Glomeromycota). The material, particularly roots, used in the invention may comprise AMF, preferably in symbiotic relationship.

Specific examples of plant of the genus *Glycyrrhiza* are:
*Glycyrrhiza acanthocarpa, Glycyrrhiza aspera, Glycyrrhiza astragalina, Glycyrrhiza bucharica, Glycyrrhiza echinata, Glycyrrhiza eglandulosa, Glycyrrhiza foetida, Glycyrrhiza foetidissima, Glycyrrhiza glabra* L., particularly the varieties *Glycyrrhiza glabra* var. *glabra, Glycyrrhiza glabra glandulifera, Glycyrrhiza gontscharovii, Glycyrrhiza iconica, Glycyrrhiza inflata, Glycyrrhiza korshinskyi, Glycyrrhiza squamulosa, Glycyrrhiza lepidota, Glycyrrhiza pallidiflora, Glycyrrhiza triphylla* (Syn.: Meristotropis *triphylla*), *Glycyrrhiza uralensis, Glycyrrhiza yunnanensis*.

Any combination of one or more of these plants of the genus *Glycyrrhiza*, particularly *Glycyrrhiza glabra*, with one or more AMF, particularly AMF mentioned herein, such as AMF from the genus *Glomus*, the genus *Acaulospora*, *Glomus mossae* or *Acaulospora laevis*, may be employed.

The material of a plant of the genus *Glycyrrhiza* may be any material, like whole plants or plant parts, such as stems, leaves, roots, and any mixture of plant parts. In a beneficial embodiment the material is roots. The material may be processed material, for example by drying, milling, grinding, comminuting, or a combination thereof. The material may alternatively or additionally be suspended and/or soaked in a liquid, particularly, and without limitation, a liquid hydrocarbon, preferably an alcohol, such as ethanol, propanol, ethanol, and/or a liquid aromatic hydrocarbon, such as Toluene or a Xylene. A liquid hydrocarbon mixture may be used such as kerosene.

AMF may be provided by any source. AMF may be provided in isolated form. AMF may be suspended and/or soaked in a liquid, particularly, and without limitation, a liquid hydrocarbon, preferably a liquid alcohol and/or a liquid aromatic hydrocarbon, such as Toluene or a Xylene. A liquid hydrocarbon mixture may be used, such as kerosene.

In one embodiment, the arbuscular mycorrhizal fungi (AMF) is selected from the genus *Glomus* and/or the genus *Acaulospora*, and particularly selected from *Glomus mossae* or *Acaulospora laevis*. Such fungi and methods for obtaining them are described in Yadav et. al, Agric Res. (2013), 2(1):43-47, which is incorporated by reference in this description.

AMF that could be employed in the invention are AMF from following genera: *Acaulospora, Ambispora, Archaeospora, Diversispora, Entrophospora, Funneliformis, Geosiphon, Gigaspora, Glomus, Claroideoglomus, Otospora, Pacispora, Paraglomus, Racocetra, Redeckera, Rhizophagus, Scutellospora, Scierocystis*.

Further AMF and information about AMF can be found in: Tancredo Souza, Handbook of Arbuscular Mycorrhizal Fungi, Springer International Publishing Switzerland 2015, ISBN 978-3-319-24848-6, ISBN 978-3-319-24850-9 (eBook), DOI 10.1007/978-3-319-24850-9, Library of Congress Control Number: 2015953773, which is incorporated by reference in its entirety.

Second Component:

The second component can be selected from
i) a plant material or -ingredient comprising plastids,
ii) algae,
iii) cyanobacteria,
either singly or in any combination or sub-combination thereof.

The term "plant material or -ingredient comprising plastids", hereinafter also just called "plant material or -ingredient", may encompass any part of a plant, such as fruits, leaves, or stems. The plant ingredient may be any ingredient that is present in the plant or gained from a plant, for example, and without limitation, by pressing or extraction. Exemplary plant ingredients are such as oil or juice, without limitation.

Plastids are organelles that are found in the cells of plants and algae. In one embodiment, plastids are selected from leucoplasts, chloroplasts, chromoplasts, and any combination thereof. Leucoplasts are, inter alia, known to store lipids, particularly oil. A special type or Leucoplasts are Elaioplasts.

The plant material may comprise one or more of the following substances:
pigments
triglycerides
fatty acids
glucosides
akinetes,
either singly or in any combination or sub-combination thereof.

The cyanobacteria can be dormant or non-dormant. In some embodiments, the cyanobacteria is an akinete cyanobacteria. Akinetes are cells in a dormant state that can resurrect when light and nutrients become available.

Cyanobacteria can particularly be selected from the following orders: Chroococcales, particularly Chroococcus or Gloeocapsa, Gloeobacterales, Nostocales, particularly the families Microchaetaceae, Nostocaceae Rivulariaceae, Scytonemataceae, Oscillatoriales, Pleurocapsales, Prochiorales, particularly the families Prochloraceae, Prochlorococcaceae, Prochlorotrichaceae, Stigonematales. The genus Acaryochioris can also be used.

The plant material or -ingredient may be processed material, for example obtained by drying, milling, grinding, comminuting, extracting a plant or plant part, or a combination thereof. The plant material or -ingredient may alternatively or additionally be suspended, dissolved, emulsified and/or soaked in a liquid, particularly, and without limitation, a liquid hydrocarbon, preferably a liquid aromatic hydrocarbon, such as Toluene or a Xylene.

The plant material or -ingredient in a further embodiment comprises, which particularly may be combined with the previous embodiment, a compound belonging to the class of phenylethanoids, particularly a tyrosol ester of elenolic acid, which may be further hydroxylated and glycosylated. Particularly suitable compounds are selected from 10-hydroxyoleuropein, ligstroside, 10-hydroxyligstroside, Oleocanthal and Oleuropein ((4S,5E,6S)-4-[2-[2-(3,4-dihydroxyphenyl)ethoxy]-2-oxoethyl]-5-ethylidene-6-[[(2S,3R,4S,5S,6R)-3,4,5-trihydroxy-6-(hydroxymethyl)-2-tetrahydropyranyl]oxy]-4H-pyran-3-carboxylic acid, methyl ester). Such compounds are believed to be harmful to SRB. Such compound(s) are preferably contained in the plant material or -ingredient, if it is olive oil.

In one embodiment, the plant is a plant of the genus Olea, particularly Olea europaea.

In one embodiment, the plant material or -ingredient is a plant oil or a plant extract, particularly a leave extract.

The plant material or -ingredient may be olive oil or leave extract from leaves of a plant of the genus Olea, particularly Olea europaea. A very beneficial plant material or -ingredient is virgin olive oil or extra virgin olive oil, i.e. unrefined olive oil, or a refined olive oil.

The term "algae" preferably means algae capable of performing photosynthesis. The algae preferably comprise plastid pigments. The algae may be microalgae or macroalgae. The algae may be selected from red algae, brown algae, Chrysophyceae (golden algae), diatom-algae and green algae. The algae may be selected from algae which occur in phytoplankton.

Algae or cyanobacteria, or algae or cyanobacteria within a plant material or -ingredient may be cultured and/or soaked in a liquid, particularly, and without limitation, a liquid hydrocarbon, preferably an alcohol or a liquid aromatic hydrocarbon, such as Toluene or a Xylene. A liquid hydrocarbon mixture may be used such as kerosene.

The first and second component may be added sequentially to the petroleum, petroleum fraction, or natural gas or at the same time. In a beneficial embodiment, the first and second component are mixed with each other and then allowed to stand before they are added to the petroleum, a petroleum fraction, or natural gas. An addition agent may be prepared from the first and second component according to a method of the invention for preparing an addition agent, and this addition agent added to the petroleum, a petroleum fraction, or natural gas.

The term mixing in this invention comprises any kind of mixing, or adding a first matter to a second, matter, or vice versa. The term mixing does not necessarily require, but may encompass, agitation, such as stirring.

Without wishing to be bound by theory and without limitation of the scope of the invention, it is believed that the first component and the second component undergo a reaction and/or association with each other, which can for example be of chemical and/or biological nature. A biological reaction may for example be formation of a composite organism. A reaction or association may change the character of the isolated components. The present invention encompasses also methods and products wherein such reaction and/or association of the first and second component has or may have occurred.

Without wishing to be bound by theory and without limitation of the scope of the invention, it is believed that AMF and cyanobacteria, or AMF and plastids, or AMF and cyanobacteria or cyanobacteria genome in a plant material or -ingredient, or AMF and algae or algae genome, form a composite organism with symbiotic character, which may also be called a "lichen" or "lichen-like" structure. It is believed according to the endosymbiotic theory that choloroplast has been developed from cyanobacteria. So, in case of cyanobacteria, it is believed that a lichen, or lichen-like organism, may also be formed when bringing in contact with AMF. The publication A. Klotz, et al., Awakening of a dormant cyanobacterium. Resuscitation of chlorotic cells reveals a genetically determined program. Current Biology, October 2016 DOI: (10.1016/j.cub.2016.08.054; https://www.sciencedaily.com/releases/2016/10/161006124409.htm) describes dormant state of cyanobacteria and that cyanobacteria may be subjected to a revival process. It is believed that a composite organism of AMF and cyanobacteria or algae is harmful to SRB in the petroleum or natural gas, without wishing to be bound by such theory and without limiting the invention to such assumed mechanism of action.

In one embodiment of the method for treating petroleum, petroleum fraction, or natural gas, adding the first and the second component is done in following steps:
   adding the second component to the petroleum, petroleum fraction, or natural gas,
   allowing the petroleum, petroleum fraction, or natural gas to stand, for example for a residence time in a discontinuous or continuous process.
   adding a mixture of the first and the second component the petroleum, petroleum fraction, or natural gas.

In this embodiment, the petroleum, petroleum fraction, or natural gas is in a first or previous step treated with the second component alone, without the first component. Concentrations in the second component in this previous step may differ from concentrations in the second component in the step when the first component is also added. It has been shown that API gravity can already be increased and sulfur content and/or salt content be reduced in advance, before the treatment with a mixture of first and second component is done. It is believed that the so called previous step of adding the second component is harmful to SRB.

In another embodiment of the method of the invention, the first component and second component that are added to the petroleum, petroleum fraction, or natural gas, which is to be treated, are comprised in a first (also called: previous) petroleum, first (also called: previous) petroleum fraction, or first (also called: previous) natural gas, wherein the first petroleum, first petroleum fraction, or first natural gas is added to the petroleum, petroleum fraction, or natural gas, which is to be treated. In this embodiment, the first or previous petroleum/petroleum fraction/natural gas can be a petroleum/petroleum fraction/natural gas that was treated by the method of the invention earlier.

In one embodiment of the method for treating petroleum, a petroleum fraction, or natural gas, the method comprises adding a further component to the petroleum, petroleum fraction, or natural gas which, wherein the further component is selected from a biocide, at least one amine, at least one or quaternary ammonium compound, or a mixture thereof. This step is preferably done before the first and second component are added, or before a second component is added solely according to the previously mentioned embodiment. After adding said further component, the petroleum, petroleum fraction, or natural gas may be allowed to stand. So, the method for treating petroleum, petroleum fraction, or natural gas may comprise following steps in following order:
   adding the further component to the petroleum, petroleum fraction, or natural gas, selected from a biocide, at least one amine, at least one or quaternary ammonium compound, or a mixture thereof,
   allowing the petroleum, petroleum fraction, or natural gas to stand, adding the second component to the petroleum or petroleum fraction, allowing the petroleum or petroleum fraction to stand, adding a mixture of the first and the second component to the petroleum, petroleum fraction, or natural gas.

The expression "allowing to stand" encompasses standing (or waiting) without agitation or with agitation.

The expression "allowing to stand" encompasses continuous, discontinuous and batch processes. In a continuous process, the time over which a matter is allowed to stand is the residence time, particularly an average residence time, for example a residence time in a tank reactor or tube reactor.

The amine or quaternary ammonium compound is in one embodiment water-soluble.

The biocide may be selected from any biocide which is harmful to SRB. A beneficial biocide is glutaraldehyde.

The further component which is selected from a biocide, at least one amine, at least one or quaternary ammonium compound, or a mixture thereof, is preferably used in aqueous media. So, the further component is preferably present in aqueous media, e.g. as solution, emulsion or suspension, and added in this state to the petroleum, petroleum fraction, or natural gas. Using aqueous media leads to at least partial extraction of SRB, particularly inactivated SRB, from the petroleum, petroleum fraction, or natural gas.

A petroleum or petroleum fraction treated according to the method of the invention is a product showing one or more of the following properties:

high API gravity (API=American Petroleum Institute), particularly higher than 40 API at 59° Fahrenheit low sulfur content, particularly less than 0.2% low salt content, particularly less than 10 PTB (pounds per thousand barrels).

high energy density, preferably of more than three times the value of commercial jet fuel, product corresponds to an ultralight sweet petroleum quality generate raffinates with high API gravity the product can be directly used, for example in combustion engines A natural gas treated according to the method of the invention is a product showing one or more of the following properties:

reduced specific gravity due to $H_2S$ extraction increased heating value due to cleaning and sweetening reduced corrosiveness of the treated natural gas A feedstock of petroleum, petroleum fraction, or natural gas, or a portion of said feedstock may be treated in discontinuous or continuous manner. The method for treatment is preferably a continuous method.

In another embodiment, the product of the method for treatment is blended with further petroleum, a further petroleum fraction, which was not treated according to the method. Such blending may reduce API gravity, raise sulfur content and raise salt content, but by choosing a suitable blending ratio, these parameters may be set in a desired and still beneficial range.

So, the method of the invention for treatment of petroleum, a petroleum fraction may further comprise:

Adding the petroleum, the petroleum fraction that was treated by adding the first component and the second component to a further petroleum, a further petroleum fraction that has not been treated in this way. By this method, it is possible to reach also in the further one or more of the benefits that were described for the method earlier, e.g. reducing sulfur and sulfur compounds, increasing API gravity etc., also in the further petroleum (fraction). In this embodiment, the product of the treatment can be used for further treatment of further petroleum (fraction) in order to reach benefits of the treatment. So it is not strictly necessary to prepare addition agent of the invention to perform the method. Using addition agent is one alternative of the method for treatment. The other alternative is using the product of the method for continuing the method for treatment of further petroleum (fraction).

This can be continued as often as desired, by extending the method as follows: repeating above step of addition once or more, thereby treating a still further petroleum or petroleum fraction, that has not been treated before. A scheme of such repeated method, performed in several generations of treatment can be illustrated as follows:

1) Treatment of petroleum (fraction) ($1^{st}$ generation) with first and second component.
2) Obtaining treated petroleum (fraction) (product of $1^{st}$ generation). The product of $1^{st}$ generation comprises first and second component.
3) Treatment of petroleum (fraction) ($2^{nd}$ generation) with product of $1^{st}$ generation
4) Obtaining treated petroleum (fraction) (product of $2^{nd}$ generation). The product of $2^{nd}$ generation comprises first and second component.
5) repeating 3) and 4) for as many further generations as desired In one embodiment of the invention, the method comprises:

adding a liquid aromatic hydrocarbon to the petroleum, or the petroleum fraction, that was treated by adding the first component and the second component (which is called a product of the method).

The product of the method can be stored for further purpose, e.g. for later treatment of further petroleum (fraction) which is still to be treated. It has been shown, that adding a liquid aromatic hydrocarbon promotes the effect of the product when it is used for treatment of the further petroleum, or the further petroleum fraction. Without wishing to be bound by theory, it is believed, that liquid aromatic hydrocarbon serves as a substrate for maintenance, growth and/or proliferation of a biological complex which is formed by the first and the second component. Such maintenance, growth and/or proliferation helps in possible further treatment of further petroleum (fractions). The liquid aromatic hydrocarbon may be a pure liquid aromatic hydrocarbon or comprised in a petroleum fraction that is not a fraction which is to be treated for any purpose of the method of the invention, e.g. for reducing sulfur and sulfur compounds. Particularly, the liquid aromatic hydrocarbon may be comprised in a diesel fuel. So, diesel fuel may be added to the petroleum, or the petroleum fraction, that was treated by adding the first component and the second component.

In one embodiment, the method comprises:

Adding a liquid aromatic hydrocarbon to the petroleum, or the petroleum fraction, that was treated by adding the first component and the second component, and then adding this mixture to a further petroleum, or the further petroleum fraction, that has not been treated. The effect of adding liqiud aromatic hdrocarbon was already mentioned before: It has been shown, that adding a liquid aromatic hydrocarbon promotes the effect of the product when it is used for treatment of the further petroleum, or the further petroleum fraction. As in the embodiment above, the liquid aromatic hydrocarbon may be a pure liquid aromatic hydrocarbon or comprised in a petroleum fraction that is not a fraction which is to be treated for any purpose of the method of the invention, e.g. for reducing sulfur and sulfur compounds.

Particularly, the liquid aromatic hydrocarbon may be comprised in a diesel fuel. So, diesel fuel may be added to the petroleum, or the petroleum fraction, that was already treated by adding the first component and the second component, before it is added to the further petroleum, or the further petroleum fraction, that has not been treated.

In a further embodiment, the method of treatment comprises:

washing the petroleum, or the petroleum fraction, after it was treated by adding the first component and the second component, with an aqueous liquid phase. Such washing is intended for, and has the effect of, removing or at least decreasing sulfur and sulfur compounds from/in the treated petroleum (fraction). For example, $H_2S$ in the petroleum may be converted to sulfur or other sulfur compound which may precipitate or remain in some extend in the treated petroleum (fraction). Such sulfur or other sulfur compound can be removed by washing from the petroleum (fraction). The aqueous phase can consist of water, or comprise water, or be based on water (>50 vol % water in the aqueous liquid phase). Washing can be done at room temperature, particularly 20-25° C., or at increased temperature, for example at 30-60° C. The aqueous liquid phase may comprise binding agents to bind sulfur or sulfur compounds, if desired. Suitable binding agents are hydroxides, such as NaOH.

In a further aspect, the invention provides with a production method for an oil product, comprising
   I) diverting a portion of a feedstock of petroleum or petroleum fraction,
   II) treating said portion of the feedstock according to the method for treating petroleum, petroleum fraction as described above,
   III) blending the product obtained in II) with the remaining part of the feedstock which was not treated according to the method for treating petroleum, petroleum fraction.

This production method may be a continuous method which can be applied upstream in subterranean reservoirs and at surficial recovery plants as well as at downstream in refining and processing facilities.

The production method may comprise one or more of following steps
   diverting the portion of the feedstock to an oil/water separator and separating water
   heating up of the separated oil stream
   Addition Agent:

The following description relates to further aspects of an above-mentioned (cf. SUMMARY OF THE INVENTION) method for preparing an addition agent for petroleum, petroleum fraction, or natural gas. Such addition agent may be prepared according to example 1 of the examples section.

The addition agent comprises above-disclosed a first component which is selected from material, particularly roots, of a plant of the genus *Glycyrrhiza*, and/or an arbuscular mycorrhizal fungi, and above-disclosed second component which is selected from of a plant material or -ingredient comprising plastids, algae and/or cyanobacteria, according to its general and specific embodiments.

The first and/or second components may already comprise a liquid component. Alternately or additionally, at least one liquid compound may be added in order to prepare the addition agent. Such liquid compound may in one embodiment be selected from a liquid hydrocarbon, preferably a liquid alcohol and/or a liquid aromatic hydrocarbon, such as Benzene, Toluene or a Xylene. A liquid hydrocarbon mixture may be used such as kerosene.

In one embodiment, the first and second component are exposed to light during mixing and/or after mixing. The light is preferably visible light, which may be composed from one or more wave-lengths. The light may be light from a white light source. In one embodiment, the light is daylight. Exposure to light may also be done when mixing further components and/or after mixing of further components.

In one embodiment, the method for producing the addition agent comprises mixing, or adding, a chalconoid compound as a further component. The term chalconoid compound comprises chalcone and derivatives of chalcone (1,3-Diphenylprop-2-en-1-one), such as substituted chalcones, preferably substituted at one of the aromatic rings. Typical, but non-limiting substituents are hydroxy, alkoxy, particularly methoxy or ethoxy, halogen or alkenyl. A specific example is 2, 4, 4' trimethoxy chalcone.

In one embodiment, the method for producing the addition agent comprises mixing, or adding plant material from the family Asteraceae or Costaceae, particularly from genus *Saussurea*, particularly *Saussurea costus*, or from the genus *Costus* as a further component. Reference is made is this regard to https://en.wikipedia.org/wiki/*Costus* and https://en.wikipedia.org/wiki/Saussurea_costus, which are incorporated by reference in its entirety. This plant material may be treated, particularly soaked, in liquid hydrocarbon, preferably a liquid alcohol and/or a liquid aromatic hydrocarbon.

In one embodiment, the method for producing the addition agent comprises mixing, or adding, one or more alcohols as a further component. The alcohol is in one more specific embodiment an aliphatic alcohol, preferably a C1-C10 alcohol, such as methanol, ethanol, propanol, butanol or pentanol, wherein all isomers thereof are encompassed.

In one embodiment, the method for producing the addition agent comprises mixing, or adding, a hydrocarbon, preferably an aromatic hydrocarbon, such as Toluene or a Xylene, as a further component.

In one embodiment, the method for producing the addition agent comprises mixing, or adding, a reverse demulsifier and/or a flocculant, as a further component.

In one embodiment, the mixture, or product, is allowed to stand after mixing the components. The first and the second component are in a beneficial embodiment brought into contact before adding them to a petroleum, petroleum fraction or natural gas, in order to form the so-called addition agent. Even more beneficially, the mixture of first and second component, and further components, if present, is allowed to stand before it is added to the petroleum, petroleum fraction or natural gas.

In a specific embodiment, the mixture is allowed to stand for at least 1 hour, preferably, at least 2 hours, or at least 4 hours, or at least 6 hours, or at least 8 hours, or 8 to 16 hours, or 10 to 12 hours, after mixing the components.

Mixing of the components may be done sequentially, in step-wise manner. In still a further embodiment an intermediate product is allowed to stand after each mixing step, i.e. after addition of any component. Standing time may be at least 1 hour, preferably, at least 2 hours, or at least 4 hours, or at least 6 hours, or at least 8 hours, or 8 to 16 hours, or 10 to 12 hours.

In a more specific embodiment of the method for preparing an addition agent, mixing of the first and second component is done by performing the following steps i) mixing the first component and at least one first liquid compound to prepare a first liquid composition,
ii) mixing the second component and at least one second liquid compound, to prepare a second liquid composition,
iii) mixing the first liquid composition and the second liquid composition.

The present invention is also directed to an independent (i.e. independent from aforedescribed method) method for preparing an addition agent for petroleum, petroleum fraction, or natural gas, the method comprising mixing
a first component which is selected from material, particularly roots, of a plant of the genus *Glycyrrhiza*, and/or arbuscular mycorrhizal fungi, and
a second component which is selected from a plant material or -ingredient comprising plastids, algae and/or cyanobacteria and
wherein mixing is done by performing the following steps
i) mixing the first component and at least one first liquid compound to prepare a first liquid composition,
ii) mixing the second component and at least one second liquid compound, to prepare a second liquid composition,
iii) mixing the first liquid composition and the second liquid composition.

In this method, same specific embodiments may apply as in a method for preparing an addition agent which was described before.

The first and the second liquid compound may be the same or different. The first and the second liquid compound may be a liquid hydrocarbon, preferably a liquid alcohol and/or a liquid aromatic hydrocarbon, such as Toluene or a Xylene.

Step i) may be done by sequentially adding portions of material, particularly roots, of a plant of the genus *Glycyrrhiza* to a volume of the first liquid compound in sequential steps and allowing to stand for 1 hour, preferably, at least 2 hours, or at least 4 hours, or at least 6 hours, or at least 8 hours, or 8 to 16 hours, or 10 to 12 hours, between each step.

The first liquid composition may be allowed to stand for at least 1 hour, preferably, at least 2 hours, or at least 4 hours, or at least 6 hours, or at least 8 hours, or 8 to 16 hours, or 10 to 12 hours, before mixing with the second liquid composition. The material, particularly roots, of a plant of the genus *Glycyrrhiza* may alternatively or additionally be suspended and/or soaked in a liquid, particularly, and without limitation, a liquid hydrocarbon, preferably a liquid alcohol and/or liquid aromatic hydrocarbon, such as Toluene or a Xylene. A liquid hydrocarbon mixture may be used such as kerosene.

Step i) may comprise adding one or more alcohols. The alcohol is in one more specific embodiment an aliphatic alcohol, preferably a C1-C10 alcohol, such as methanol, ethanol, propanol, butanol or pentanol, wherein all isomers thereof are encompassed.

The present invention relates, in a further aspect also to the use of a mixture of
a) a first component which is selected from material, particularly roots, of a plant of the genus *Glycyrrhiza*, and/or an arbuscular mycorrhizal fungi, and
b) a second component which is selected from of a plant material or -ingredient comprising plastids, algae and/or cyanobacteria,
for treatment of petroleum, petroleum fraction or natural gas.

The present invention relates, in a further aspect also to the use of a component which is selected from material, particularly roots, of a plant of the genus *Glycyrrhiza*, and/or an arbuscular mycorrhizal fungi, for treatment of petroleum, petroleum fraction or natural gas. This aspect relates to the use of the first component only.

The present invention relates, in a further aspect also to the use of a component which is selected from of a plant material or -ingredient comprising plastids, algae and/or cyanobacteria, for treatment of petroleum, petroleum fraction or natural gas. This aspect relates to the use of the second component only.

EXAMPLES

Figure 1:
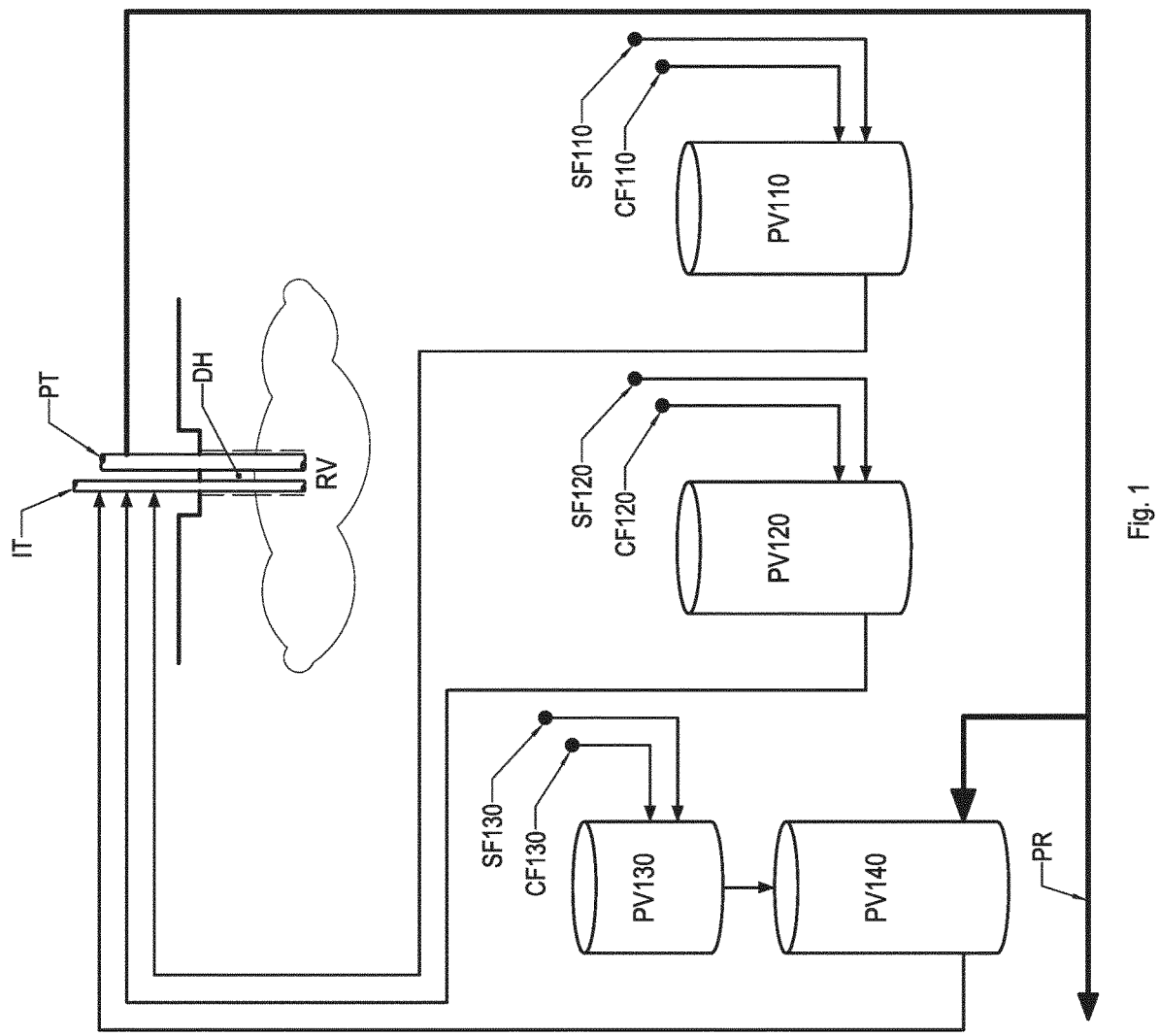
FIG. 1 shows a schematic flow diagram of a process of the invention for the treatment of a subterranean petroleum reservoir.

Example 1: Preparation of an Addition Agent of the Invention

The following procedure relates to preparation of concentrated chemo-biological fermentation solution, which is also called a "lichen" solution.

1.1 STEP NO. 1: Preparation of Maceration of "*Glycyrrhiza glabra*/Licorice"
  A. Soak 2000 g of licorice in 435 g of suitable aromatic solvent such as Xylenes $C_8H_{10}$ (about 500 ml).
  B. Soaking is encountered in ten steps at every step soak 200 g of licorice with the same volume amount of Xylenes.
  C. The reaction time is 10-14 hours between every step. Total reaction time=10-14 hours×10=100-140 h.

1.2 STEP NO. 2: Preparation of a Virgin (Bitter) Olive Oil Solution
  A. Add 400 ml of bitter olive oil+1000 ml of Xylenes (concentration 28.5%).
  B. Add 300 ml Pentan-1-ol $C_5H_{12}O$.
  C. Add 500 ml methanol.

1.3 STEP NO 3: Preparation of Refined Olive Oil Solution
  A. Add 500 ml of refined olive oil+1000 ml of Xylenes (concentration 33%).
  B. Add 300 ml Pentan-1-ol $C_5H_{12}O$.
  C. Add 500 ml methanol.

1.4 STEP NO 4: Preparation of Reverse Demulsifier-DeOiler (Polyacrylamide Flocculant)
  Add 500 ml of chemical SpectraFloc™ 875+1000 ml of Xylenes (concentration 33%).

1.5 STEP NO 5: Preparation of Chalcone Chemical
  Add 250 g of Chalcone+870 g Xylenes.

1.6 STEP NO 6:
  Prepare 1750 ml of Toluene.

1.7 Preparation of Final Mixture
  The products of above-mentioned steps are mixed with exposure to light.

a) Mix STEP NO 2 product with STEP NO 1 product, encounter the complex mix in reaction time 10-14 h.
b) Add STEP NO 3 product to mix, in reaction time 10-14 h
c) Add STEP NO 4 product to mix, in reaction time 10-14 h
d) Add STEP NO 5 product to mix, in reaction time 10-14 h
e) Add STEP NO 6 product to mix, in reaction time 10-14 h, thereby obtaining the addition agent of the invention.

Amounts of chemicals:
400 ml of Virgin Olive Oil
500 ml of refined Olive Oil
600 ml of Pentan-1-ol
1000 ml of Methanol
500 ml of SpectraFloc™ 875
4500 ml of Xylenes
1750 ml of Toluene
250 g of Chalcone
2000 g of Licorice For following examples see also the list of reference symbols as enclosed.

Example 2: Treatment of a Subterranean Petroleum Reservoir

A specific embodiment of the process is the treatment of a subterranean petroleum reservoir RV (FIG. 1) via downhole injection. The treatment solutions are prepared in the vessels PV110, PV120 and PV130. PV110 mixes cyanobacteria or olive oil (refined and bitter mixture) (CF110) with kerosene (SF110), PV120 mixes biocide (glutaraldehyde, NovaCide 1125™ by Nova Star LP), and amine/quaternary ammonium compound (one or more of corrosion inhibitors Nova Star NS-1435™, NS-1442™, NS-1471™, NS-2129™, NS-1445™ by Nova Star LP) (CF120) with water (SF120) and PV130 mixes the additive produced in example 1, supra (CF130)—with kerosene (SF130). PV130 then feeds the fermentor PV140. The actual treatment is done in two stages:

1. Batch sequential injection with shut-in wellhead.
   First, the extractor treatment solution from PV120 in concentrations of around 2% and 5% respectively, is pumped into the downhole DH with high pressure pumps where it is injected into the reservoir RV sequentially via injection tubing IT.
   The reaction interval time is about 12 hours after each injection; this initial cycle consists of four steps and can be repeated as required based on sample laboratory analysis results.
   Second, the reactor treatment solution from PV110 in concentration of around 20% is pumped into the downhole DH with high pressure pumps where it is injected into the reservoir RV via injection tubing IT.
   This stage inhibits SRB growth and reduces their bioactivity. $H_2S$ and sulfur are reduced by about 50% at this stage as the sulfur content in crude oil is proportional to the SRB colony population within crude oil.
2. Continuous partial injection with flowing well.
   A portion of the production crude oil stream (5% to 15%) is forwarded to fermentor vessel PV140 for treatment by adding around 10% of a chemo-biological fermentation solution with ca. 16% concentration.
   The typical fermentation time in PV140 is about 72 hours.
   The fermented product from PV140 is pumped into the downhole DH with high pressure pumps where it is injected into the reservoir RV via injection tubing IT continuously to improve the crude oil stream flow through the production tubing PT as required.
   This stage develops the energetic biological anti-degradation reactions in the reservoir RV formation that enhance the hydrocarbon chains, increase API gravity, decrease viscosity, and reduce sulfur contents and $H_2S$ concentration by about 90%.

The quantity of treatment solutions to be injected and number of cycles is determined specifically for each well as it depends on various factors, e.g. the composition of the crude oil, the production volume and treatments targets. The initial bio-reaction retention time in the reservoir RV is minimum 24 hours.

The embodiment of the invention according to FIG. 1 particularly reduces sulfur, salts and heavy metals content, lowers the $H_2S$ concentration to harmless levels (<10 ppm), increases API gravity and decreases viscosity in the product PR.

Example 3: Treatment of Petroleum or Petroleum Fractions in Surficial Recovery Plants and Downstream Refining and Processing Facilities Another specific embodiment of the process is the treatment of petroleum and petroleum fractions (FIG. 2) in surficial recovery plants and downstream refining and processing facilities. The treatment solutions are prepared in the vessels PV240, P250 and PV290. PV240 mixes cyanobacteria or olive oil (CF210) with kerosene (SF210), PV250 mixes biocide and amine (products as in example 2 supra) (CF220) with water (SF220) and PV290 mixes the addition agent produced in example 1, supra (CF230)—with kerosene (SF230). PV290 then feeds the fermentor PV260. The actual treatment is done as follows:

A feed stock FS portion (ca. 20%) from the production manifold or storage facility is routed into PV210 for separation of gas and water (water is extracted via drain DR) from the crude oil by gravity segregation.

The separated crude oil stream is heated in HE210 to ca. 80 Celsius before being forwarded to extractor PV220.

The heated crude oil stream in PV220 is injected sequentially with extractor treatment solution (around 20% of the heated crude oil quantity) from PV250 in concentrations of around 2% and 5%, respectively.

The reaction interval time is about 12 hours after each injection; this initial cycle consists of four steps and can be repeated as required based on sample laboratory analysis results.

The extracted SRB in the bottom water (sludge) of PV220 are removed via the blowdown BD at the end of each reaction cycle.

When the reaction is complete, the downstream product is forwarded to reactor PV230.

Here it is injected with reactor treatment solution from PV240 (around 5-10% of the intermediate product volume) in concentration of around 20%.

The bio-reaction time in reactor PV230 is about 12 hours (without water draining).

When the reaction is complete, the downstream product is forwarded to fermentor PV260.

Here it is injected with a chemo-biological fermentation solution from PV290 (around 15% of the intermediate product volume) in concentration of around 16%.

The typical fermentation time in PV260 is about 72 hours.

The fermentation process gain in PV260 in terms of volume of downstream product is in the range of 30% to 50%.

When the reaction is complete, the fermented product is forwarded to product mixer PV270 or it may be used directly, e.g., as a high energy, clean fuel for combustion engines or turbines in conjunction with fuel injection system modification accommodating for the higher calorific value of these raffinates RA.

In PV270, the fermented product is mixed with the remaining 80% of feedstock FS.

The bio-reactivity of the fermented oil in PV270 is highly efficient and dynamic. The energy flow to increase the Gibbs energy of the hydrocarbons (their calorific value) happens on the account of the complete inhibition of SRB, utilizing its stored energy (even from its decomposed dead cells) in the anabolism of the new hydrocarbon chains.

The typical reaction time in PV270 is about 72 hours.

When the reaction is complete, the finished product is forwarded to PV280, ready for shipment.

A portion of the finished product PR from product tank PV280 may serve as makeup for the fermentor PV260 as required.

The fermentor PV260 can be composed of one or more physical vessels to shorten cycle times, e.g. one in reaction complete state, one in makeup state and one in fermented product delivery state.

Typical feedstock and treatment parameters are listed in the table below.

| | Measurements | | | |
|---|---|---|---|---|
| Reference Point | API Gravity | Sulfur, % | Bottom Sediment and Water, % | Salt, PTB |
| Feedstock FS, untreated | 24.8 | 1.89 | 4 | 398 |
| Fermenter Inlet | 33 | 0.95 | 0.8 | 80 |
| Fermenter Outlet (Raffinates RA) | 35 | 0.23 | 0.5 | 49 |
| Finished Product (Product PR) | 44 | 0.08 | nil | 7 |

So called raffinates RA corresponds to an ultralight sweet petroleum quality. Product PR corresponds to a light sweet petroleum quality.

Figure 2:
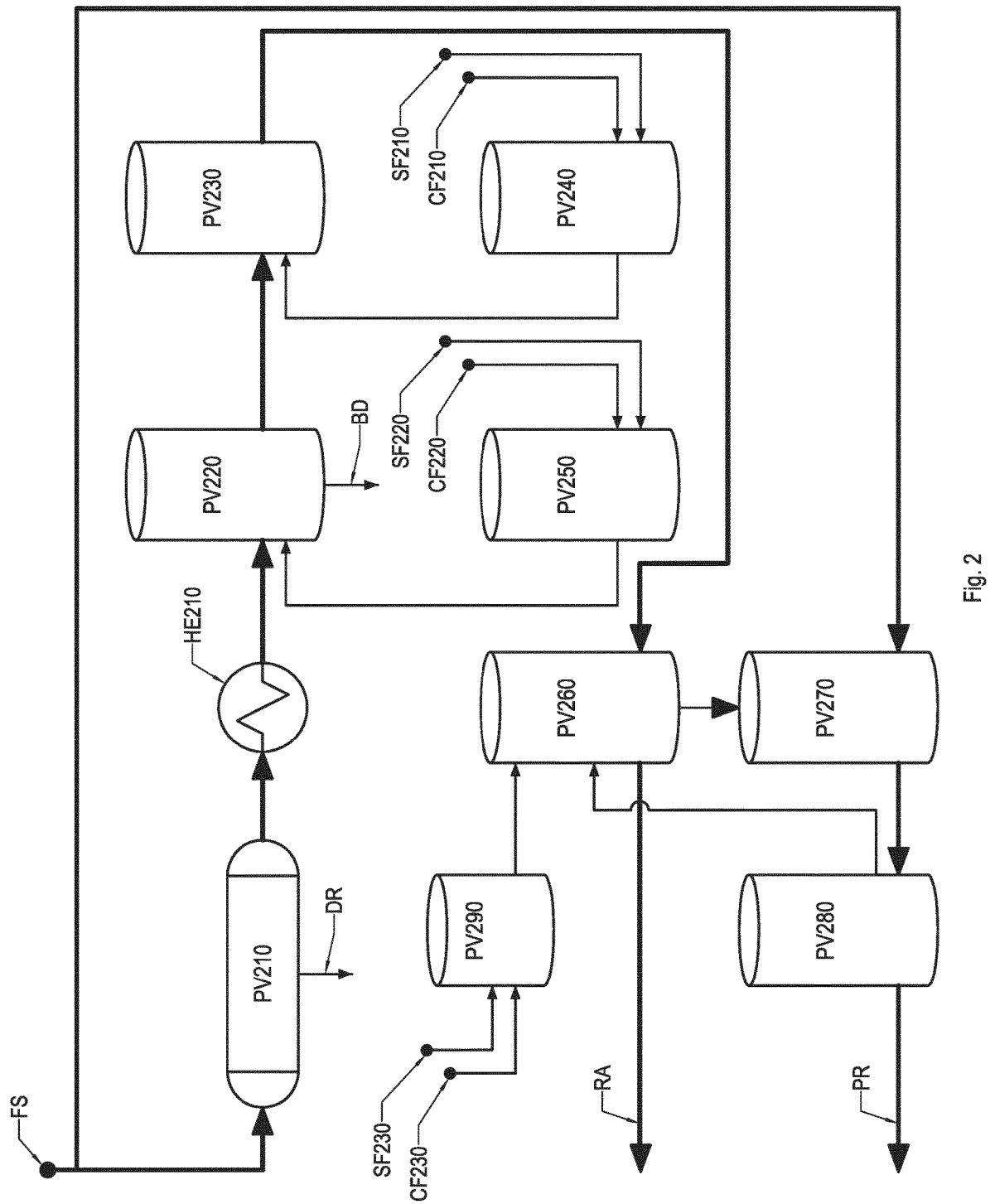
FIG. 2 shows a schematic flow diagram of a process of the invention for the treatment of petroleum and its fractions in surficial recovery plants and downstream refining and processing facilities.

The benefits of the embodiment of FIG. 2 are comparable to FIG. 1, i.e. one or more of above-mentioned benefits can be reached. Moreover, it generates high energy, clean raffinates RA.

The quantity of treatment solutions to be injected and number of cycles is determined specifically for each application as it depends on various factors, e.g. the composition of the crude oil, the production volume and treatments targets.

Figure 3:
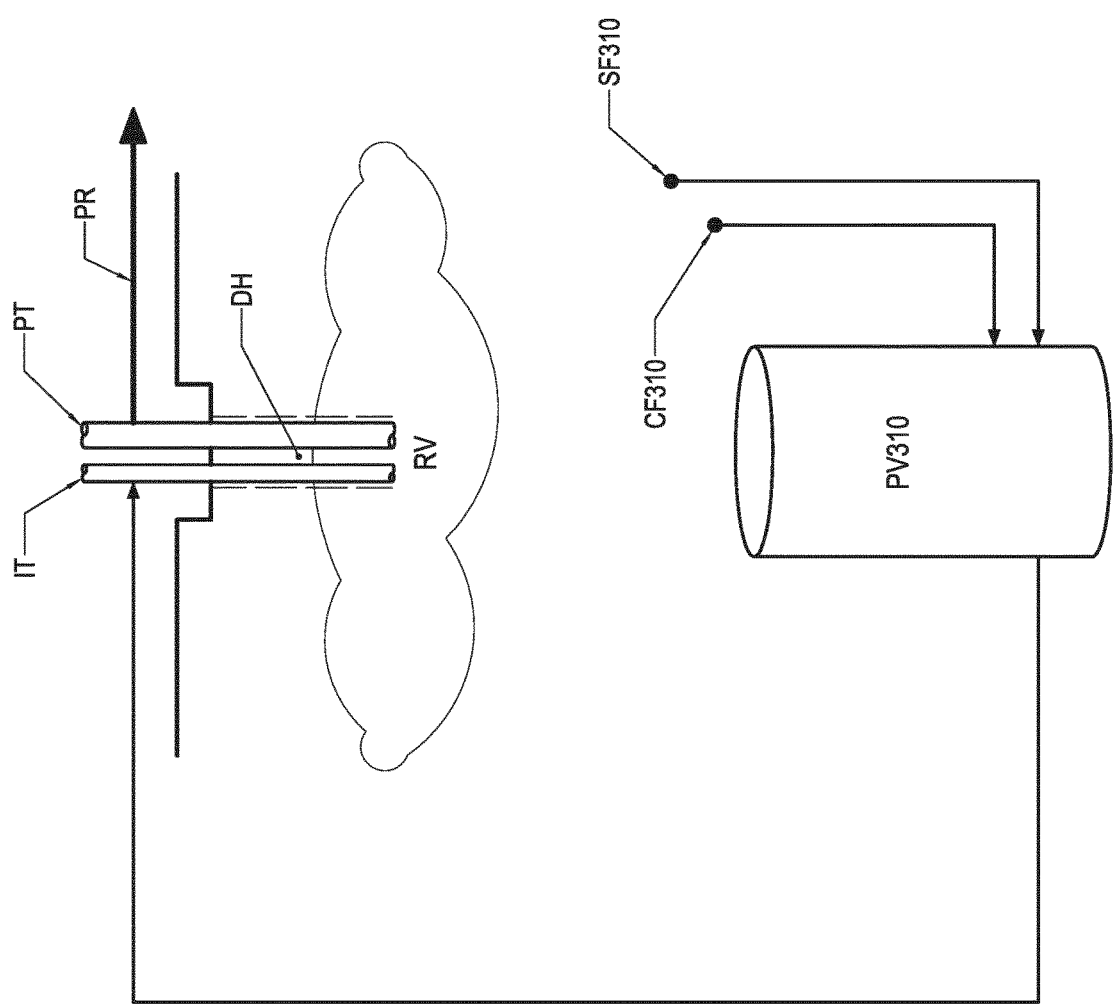
FIG. 3 shows a schematic flow diagram of a process of the invention for the treatment of a subterranean natural gas reservoir.

Example 4: Treatment of Sour Natural Gas in a Subterranean Natural Gas Reservoir FIG. 3 shows a natural gas reservoir RV. Fermentor Solution mixer PV310 mixes the addition agent produced in example 1, supra (CF310)—with methanol (SF310). The mix is fed into the natural gas reservoir RV via injection tubing IT. Treated (i.e. sweetened) natural gas is obtained as a product PR from the production tubing PT.

Example 5: Treatment of Natural Gas in Downstream Refining and Processing Facilities In FIG. 4, fermentor solution mixer PV410 mixes the product produced in example 1, supra (CF410)—with methanol (SF410). The mix is fed into the pipeline between feedstock FS and separator PV420 with the liquids (black water and condensate) extracted via drain DR. So, the natural gas from the feedstock FS is treated during flowing through the pipeline. Moreover, the mix from PV410 is also fed into the separator PV420 itself to treat natural gas in the separator. Solutions of biocide and amine treatment can be applied in addition to the above-described procedure.

Figure 4:
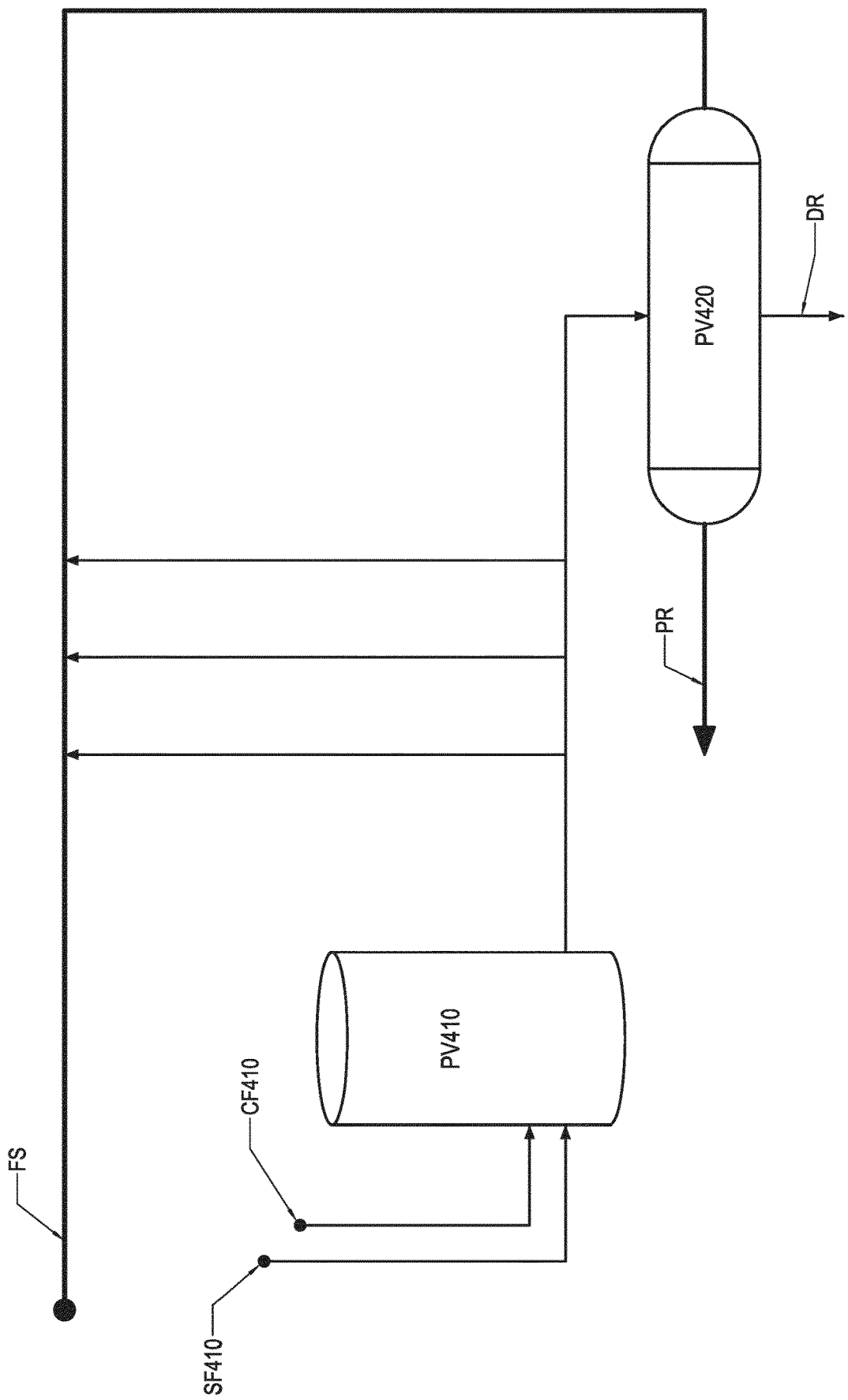
FIG. 4 shows a schematic flow diagram of a process of the invention for the treatment of natural gas in downstream refining and processing facilities.

The embodiments in FIGS. 3 and 4 reduce sulfur (sweeten sour gas), increase the heat rate, decreases the specific gravity and lowers the $H_2S$ concentration to harmless levels (<10 ppm).

It has to be emphasized that above examples illustrate the essence of the invention. The details, such as amounts and concentrations may vary from application to application (e.g. kind of feedstock, treatment target, man-made plant or natural reservoir) without leaving the scope and idea of the invention.

Example 6: Treatment of Oil Sand

Oil sand, as mined, was placed into a vessel.

In the next step, addition agent of the invention, as prepared in example 1, was added to the vessel. The process was accelerated by stirring or tumbling.

After a retention time of 1 h, for which the above mixture is allowed to stand, easy accessible hydrocarbons (>50%) were separated from the non-organic solids and transformed into crude oil-like product.

The obtained crude oil-like product was siphoned off. Hot water (>80° C.) was added in order to accelerate the transformation of the remaining solidified hydrocarbons into crude oil-like product. This transformation needed about 24 h. The process was accelerated by stirring or tumbling.

Remaining non-organic solids were completely stripped of hydrocarbons. After the clean crude oil-like product has been siphoned off, the wash water could be recirculated, possibly after some treatment, if required (e.g. sulfates extraction).

Example 7: Preparation of Addition Agent

1. *Glycyrrhiza*, particularly *Glycyrrhiza glabra* was put into ethanol (alternatively fuel, diesel fuel, and/or pure liquid aromatic hydrocarbon) and allowed to stand for some days.
2. As optional component *Saussurea costus* was put into ethanol (alternatively fuel, diesel, and/or pure liquid aromatic hydrocarbon) and allowed to stand for some days.
3. Olive oil was added to 1., or both componts from 1. and and 2. were mixed and olive oil added. Further ethanol may be added.
4. After some days Xylene was added, or alternatively (diesel) fuel, methanol, butanol, as "Substrates and Carriers". The carrier is selected according to the desired use. For example, the addition agent should have a thin viscosity in order to be dispersed into natural gas, if natural gas should be treated.

Above examples were repeated with other sources of plastids or cyanobacteria than the olive oil which was used in above examples. For example, oil from other plants, or plant material from other plants comprising plastids or cyanobacteria also performed well.

Further Examples

Further examples could be performed with any combinations of
a) *Glycyrrhiza*, and/or arbuscular mycorrhizal fungi (first component), and
b) plastids, algae and/or cyanobacteria (second component)

Specific examples of *Glycyrrhiza*, arbuscular mycorrhizal fungi and cyanobacteria are mentioned in the detailed description, and these could be used in any combination. Similar procedures as explained above could be employed.

LIST OF REFERENCE SYMBOLS

FIG. 1:
IT: Injection Tubing
PT: Production Tubing
PR: Product
DH: Downhole
RV: Reservoir
PV110: Reactor Solution Mixer
PV120: Extractor Solution Mixer
PV130: Fermentor Solution Mixer
PV140: Fermentor
CF110: Reactor Chemicals Feed
CF120: Extractor Chemicals Feed
CF130: Fermentor Chemicals Feed
SF110: Reactor Solvent Feed
SF120: Extractor Solvent Feed
SF130: Fermentor Solvent Feed
FIG. 2:
FS: Feedstock
PR: Product
DR: Drain
BD: Blowdown
RA: Raffinates
PV210: Separator
HE210: Heater
PV220: Extractor
PV230: Reactor
PV240: Reactor Solution Mixer
PV250: Extractor Solution Mixer
PV260: Fermentor
PV270: Product Mixer
PV280: Product Tank
PV290: Fermentor Solution Mixer
CF210: Reactor Chemicals Feed
CF220: Extractor Chemicals Feed
CF230: Fermentor Chemicals Feed
SF210: Reactor Solvent Feed
SF220: Extractor Solvent Feed
SF230: Fermentor Solvent Feed
FIG. 3:
IT: Injection Tubing
PT: Production Tubing
PR: Product
DH: Downhole
RV: Reservoir
PV310: Fermentor Solution Mixer
CF310: Fermentor Chemicals Feed
SF310: Fermentor Solvent Feed
FIG. 4:
FS: Feedstock
PR: Product
DR: Drain
PV410: Fermentor Solution Mixer
PV420: Separator
CF410: Fermentor Chemicals Feed
SF410: Fermentor Solvent Feed

The invention claimed is:

1. A method for treating petroleum, a petroleum fraction, or natural gas, comprising:
adding
a) a first component comprising arbuscular mycorrhizal fungi, and
b) a second component comprising a plant material comprising plastids, a plant ingredient comprising plastids, and/or cyanobacteria,
to the petroleum, petroleum fraction, or natural gas,
wherein the method reduces sulfur and/or sulfur compounds in the petroleum, the petroleum fraction, or the natural gas.

2. The method of claim 1, wherein the first component and second component that are added to the petroleum, or petroleum fraction, which is to be treated, are comprised in a first petroleum, or first petroleum fraction, wherein the first petroleum, or first petroleum fraction is added to the petroleum, or petroleum fraction which is to be treated.

3. The method of claim 1, further comprising:
c) adding the petroleum, or the petroleum fraction, that was treated by adding the first component and the second component to a further petroleum, or a further petroleum fraction, that has not yet been treated by the method, and
d) optionally repeating step c) once or more, thereby treating a still further petroleum or petroleum fraction, that has not been treated before.

4. The method of claim 1, comprising: adding a liquid hydrocarbon to the petroleum, or the petroleum fraction, after it was treated by adding the first component and the second component.

5. The method of claim 1, further comprising: washing the petroleum, or the petroleum fraction, after it was treated by adding the first component and the second component, with an aqueous liquid phase.

6. The method of claim 1, wherein the plant material or plant ingredient is from a plant of the genus *Olea*.

7. The method of claim 1, wherein the plant material or plant ingredient is a plant oil or a plant extract.

8. The method of claim 1, wherein the plant material or plant ingredient comprises a phenylethanoid compound.

9. The method of claim 1, wherein the arbuscular mycorrhizal fungi is from the genus *Glomus* and/or the genus *Acaulospora*.

10. The method of claim 1, wherein adding the first and the second component comprises:
adding the second component to the petroleum, petroleum fraction, or natural gas,
allowing the petroleum, petroleum fraction, or natural gas to stand, and
adding a mixture of the first and the second component the petroleum, petroleum fraction, or natural gas.

11. The method of claim 1, comprising adding a further component to the petroleum, petroleum fraction, or natural gas, wherein the further component is a biocide, at least one amine, at least one quaternary ammonium compound, or a mixture thereof.

12. The method of claim 1, wherein the method increases API gravity in the petroleum, the petroleum fraction, or the natural gas.

13. The method of claim 1, wherein the method decreases viscosity in the petroleum, the petroleum fraction, or the natural gas.

* * * * *